United States Patent
Kigawa et al.

(10) Patent No.: US 12,099,017 B2
(45) Date of Patent: Sep. 24, 2024

(54) INSPECTION SYSTEM, INSPECTION METHOD, AND INSPECTION PROGRAM

(71) Applicant: Nitto Denko Corporation, Ibaraki (JP)

(72) Inventors: Yoichi Kigawa, Osaka (JP); Yatfei Chan, Osaka (JP)

(73) Assignee: NITTO DENKO CORPORATION, Ibaraki (JP)

( * ) Notice: Subject to any disclaimer, the term of this patent is extended or adjusted under 35 U.S.C. 154(b) by 371 days.

(21) Appl. No.: 17/579,971

(22) Filed: Jan. 20, 2022

(65) Prior Publication Data

US 2022/0236192 A1   Jul. 28, 2022

(30) Foreign Application Priority Data

Jan. 26, 2021   (JP) .................. 2021-010592

(51) Int. Cl.
  *G01N 21/88*   (2006.01)
  *G06T 7/11*   (2017.01)
(52) U.S. Cl.
  CPC ..... *G01N 21/8851* (2013.01); *G01N 21/8803* (2013.01); *G06T 7/11* (2017.01); *G06T 2207/20081* (2013.01)
(58) Field of Classification Search
  None
  See application file for complete search history.

(56) References Cited

U.S. PATENT DOCUMENTS 10,212,869 B2 * 2/2019 Toyoda ............... H05K 13/08
10,438,340 B2 * 10/2019 Wen ..................... G01N 21/956
10,997,713 B2 * 5/2021 Morino ................... G06T 7/11
(Continued)

FOREIGN PATENT DOCUMENTS

| JP | 2013-98267 A | 5/2013 |
|---|---|---|
| JP | 2020-52474 A | 4/2020 |
| WO | 2020/121239 A2 | 6/2020 |

OTHER PUBLICATIONS

Zhao Zhixuan et al: "A Surface Delect Detection Method Based on Positive Samples", Jul. 27, 2018 (Jul. 27, 2018), Advances in Biometrics: International Conference, ICB 2007, Seoul, Korea, Aug. 27-29, 2007; Proceedings; [Lecture Notes in Computer Science; Lect.Notes Computer], Springer, Berlin, Heidelberg, pp. 473-481, XP047481215, ISBN 978-3-540-74549-5, [retrieved on Jul. 27, 2018]  abstract  section 3.3 to Get the Position of the Defect matchred pixels.; Cited in Extended European Search Report, dated Jun. 24, 2022.

(Continued)

*Primary Examiner* — Anand P Bhatnagar
(74) *Attorney, Agent, or Firm* — WHDA, LLP

(57) ABSTRACT

An inspection system includes a memory; and a processor, wherein the memory is configured to hold an image reproducing model trained to reproduce, from a first masked image generated by masking part, of a first image determined as including no defect from among images that capture an object to be inspected, the first image before being masked, and wherein the processor is configured to determine, based on a reproduced image reproduced by inputting a second masked image generated by masking part of a second image that captures a new object to be inspected into the image reproducing model, and the second image, whether the second image includes a defect.

8 Claims, 13 Drawing Sheets

(56) References Cited

U.S. PATENT DOCUMENTS

| | | | |
|---|---|---|---|
| 11,189,021 B2 * | 11/2021 | Shah | H04N 23/74 |
| 11,215,564 B2 * | 1/2022 | Wada | G01N 21/8851 |
| 11,423,529 B2 * | 8/2022 | Girmonsky | G06F 17/18 |
| 11,774,859 B2 * | 10/2023 | Freytag | G03F 7/705 |
| | | | 382/144 |
| 2019/0279349 A1 * | 9/2019 | Morino | G06T 7/97 |
| 2020/0232934 A1 | 7/2020 | Feldman et al. | |
| 2021/0004945 A1 * | 1/2021 | Li | G06V 10/764 |
| 2021/0073969 A1 * | 3/2021 | Freytag | G06F 30/20 |
| 2022/0036531 A1 * | 2/2022 | Shah | G06T 7/60 |
| 2023/0408929 A1 * | 12/2023 | Freytag | G06V 10/774 |

OTHER PUBLICATIONS

LV Chengkan et al, "A Fast Surface Defect Detection Method Based on Background Reconstruction", International Journal of Precision Engineering and Manufacturing, Korean Society for Precision Engineering, Springer, vol. 21, No. 3, Nov. 9, 2019 (Nov. 9, 2019), pp. 363-375, XP037027200, ISSN 2234-7593, DOI:10.1007/S12541-019-00262-2, [retrieved on Sep. 9, 2019] * abstract *; Cited in Extended European Search Report dated Jun. 24, 2022.

The Extended European Search Report dated Jun. 24, 2022, issued in counterpart EP Application No. 22152408.5. (9 pages).

Office Action dated Jul. 9, 2024, issued in counterpart JP application No. 2021-010592, with English translation. (4 pages).

* cited by examiner

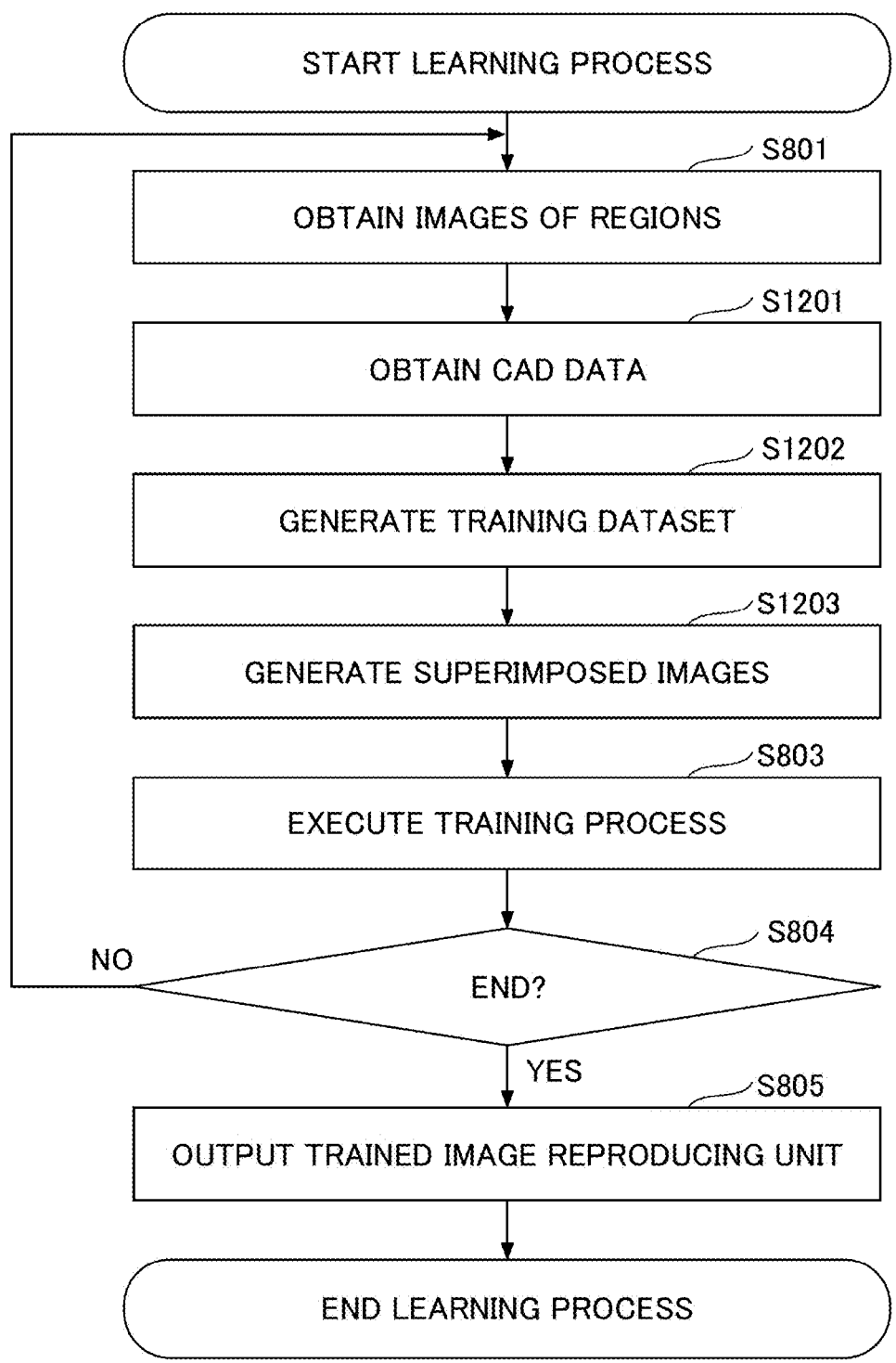

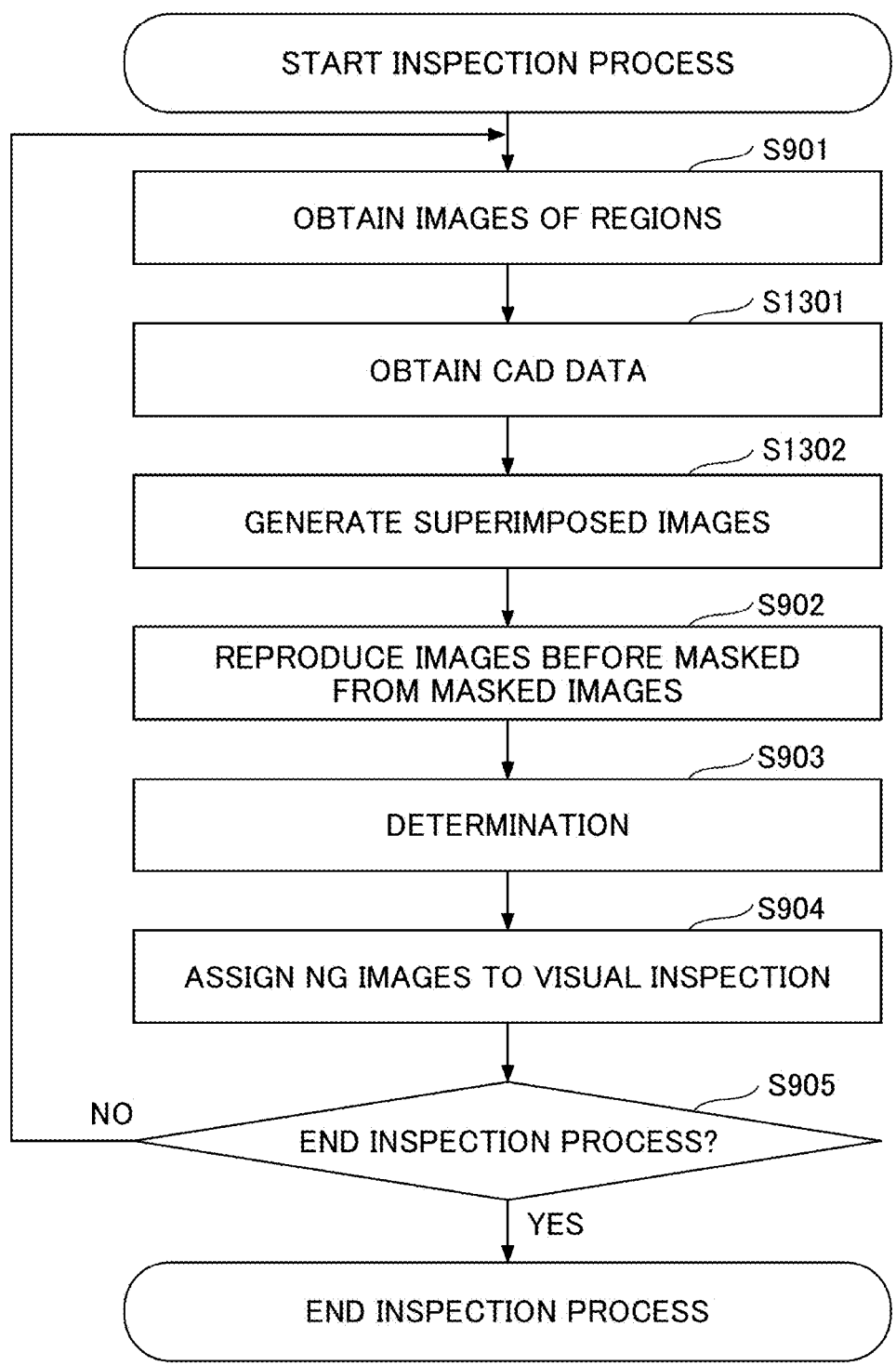

INSPECTION SYSTEM, INSPECTION METHOD, AND INSPECTION PROGRAM

CROSS-REFERENCE TO RELATED APPLICATIONS

The present application is based upon and claims the benefit of priority under 35 USC 119 of Japanese Patent Application No. 2021-010592 filed on Jan. 26, 2021, the entire contents of which, including the description, claims, drawings, and abstract, are incorporated herein by reference.

TECHNICAL FIELD

The present disclosure relates to an inspection system, an inspection method, and an inspection program.

BACKGROUND ART

Conventionally, an inspection system has been known, in which an object to be inspected, such as a printed circuit board, is captured in an image to be compared with a reference image, so as to inspect whether the object to be inspected is a good product or a defective product.

In the inspection system, for example, in order to avoid taking a defective product as a good product, candidate defects are detected in excess, and the images of the detected candidate defects are finally visually inspected by an inspector, to realize prevention of missing defects.

RELATED ART DOCUMENTS

Patent Documents

[Patent Document 1] Japanese Laid-Open Patent Application No. 2013-098267
[Patent Document 2] Japanese Laid-Open Patent Application No. 2020-052474

However, in the case of the inspection system described above, manufacturing variations and the like within a range of good products are also detected as candidate defects; therefore, there have been problems such that there are many images of candidate defects that need to be visually inspected by the inspector, and hence, the workload of the inspector is high.

SUMMARY

According to one embodiment, an inspection system includes a memory; and a processor, wherein the memory is configured to hold an image reproducing model trained to reproduce, from a first masked image generated by masking part of a first image determined as including no defect from among images that capture an object to be inspected, the first image before being masked, and wherein the processor is configured to determine, based on a reproduced image reproduced by inputting a second masked image generated by masking part of a second image that captures a new object to be inspected into the image reproducing model, and the second image, whether the second image includes a defect.

BRIEF DESCRIPTION OF DRAWINGS

FIG. 12 is a second flow chart illustrating a flow of a learning process in the inspection system; and FIG. 13 is a second flow chart illustrating a flow of an inspection process in the inspection system.

EMBODIMENTS OF THE INVENTION

In the following, embodiments will be described with reference to the accompanying drawings. Note that throughout the description and the drawings, for elements having substantially the same functional configurations, the same reference signs are assigned, and duplicate descriptions are omitted.

According to an embodiment in the present disclosure, the workload of an inspector in an inspection system can be reduced.

First Embodiment

System Configuration of Inspection System in Learning Phase

Figure 1:
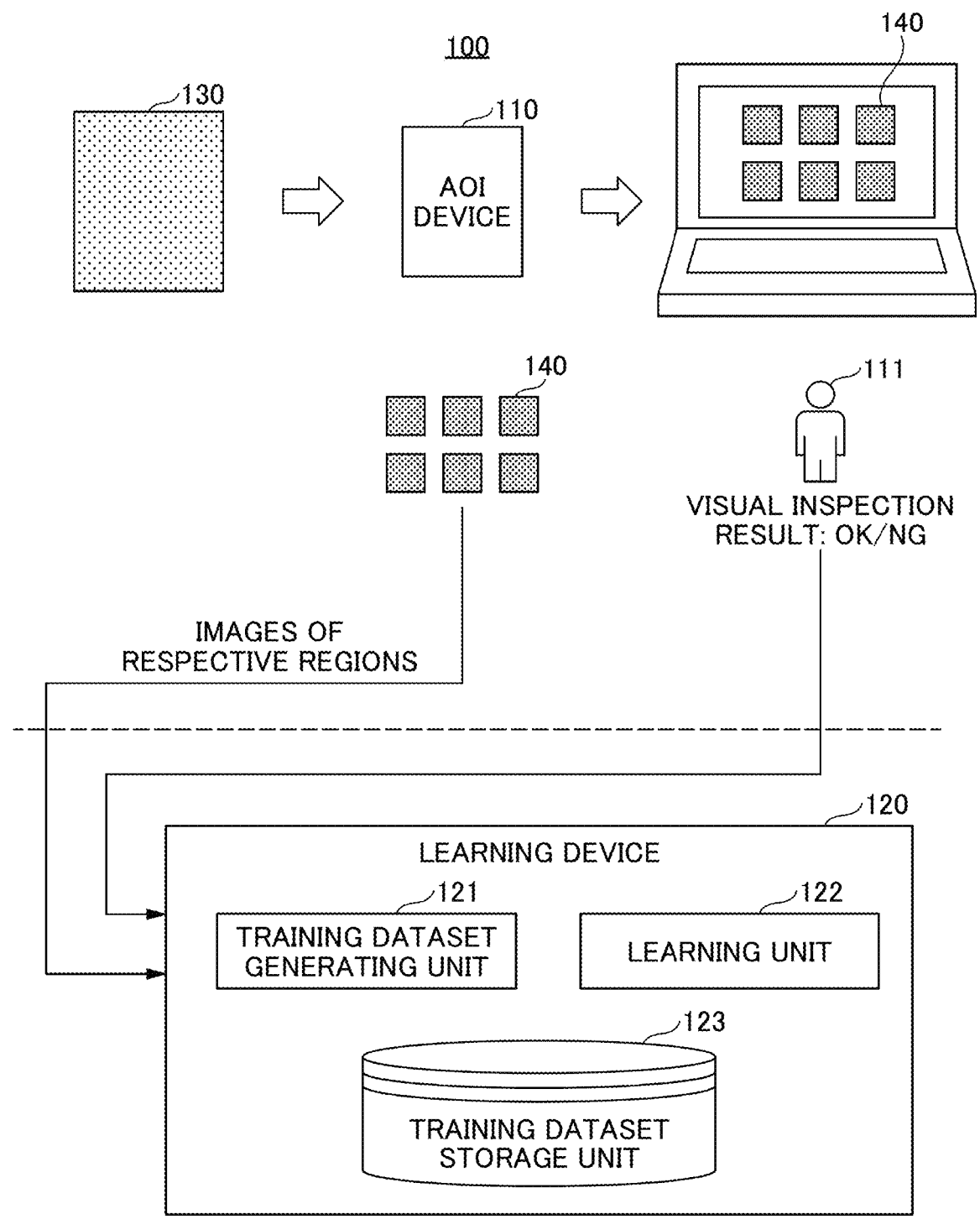
FIG. 1 is a diagram illustrating an example of a system configuration of an inspection system in a learning phase.

First, a system configuration of an inspection system in a learning phase according to a first embodiment will be described. FIG. 1 is a diagram illustrating an example of a system configuration of an inspection system in a learning phase.

As illustrated in FIG. 1, an inspection system 100 in a learning phase includes an automated optical inspection (AOI) device 110 and a learning device 120.

The AOI device 110 executes automated appearance inspection of a printed circuit board 130. The AOI device 110 scans the printed circuit board 130 with a camera, and inspects various inspection items, to detect candidate defects. The inspection items inspected by the AOI device 110 include, for example, circuit widths, circuit spacing, missing pads/no pads, short circuits, and the like.

An image 140 of each region that includes a candidate defect detected by the AOI device 110 is transmitted to the learning device 120, and also transmitted to an inspection line. On the inspection line, an inspector 111 as one of the inspectors visually inspects the image 140 of each region that includes a candidate defect. Note that the AOI device 110 is assumed to be configured to in excess detect images of the respective regions that include candidate defects so as not to take a defective product as a good product.

The inspector 111 visually inspects the images 140 of the respective regions to determine whether any defect is included, and to finally determine whether the printed circuit board 130 is a good product or a defective product. Specifically, in the case where none of the images 140 of the respective regions that include the candidate defects includes a defect, the printed circuit board 130 is determined as a good product. Alternatively, in the case where any one of the images 140 of the respective regions that include the candidate defects includes a defect, the printed circuit board 130 is determined as a defective product.

Note that the inspector 111 informs the learning device 120 of results of visual inspection (results of determining whether the images 140 of the respective regions include defects). In the example in FIG. 1, "visual inspection result: OK" means that it is determined that a defect, is not included in the images of the regions that include the candidate defects, whereas "visual inspection result: NG" means that it is determined that a defect is included in the images of the regions that include the candidate defects.

A learning program is installed in the learning device 120, and by executing the program, the learning device 120 functions as a training dataset generating unit 121 and a learning unit 122.

The training dataset generating unit 121 extracts images that are determined as not including defects as the results of visual inspection performed by the inspector 111, from among the images 140 of the respective regions that include the candidate defects transmitted from the AOI device 110. Also, the training dataset generating unit 121 associates the extracted image of each region with a corresponding result of the visual inspection, and stores the associated data in the training dataset storage unit 123 as a training dataset.

The learning unit 122 reads the image of each region included in the training dataset stored in the training dataset storage unit 123. Also, the learning unit 122 generates a masked image by masking part of the image of the region, and from the generated masked images, executes a learning process for a model so as to reproduce the image before being masked.

Note that as the model for which the learning process is executed by the learning unit 122, for example, a model for complementing a blanked-out region of an image is used. In the model, in the case of receiving as input an image having part of it blanked out, the blanked-out region is complemented based on a surrounding region of the blanked-out region, to reproduce the original image before it is blanked out. In the following, such a model will be referred to as an "image reproducing unit" in the present description, as an example of "image reproducing model" in the claims. Note that the method implementing the learning process includes, for example, decision trees, support vector machines, logistic regression, linear regression, neural networks, deep learning, and the like, though not limited as such.

Hardware Configuration of Learning Device

Figure 2:
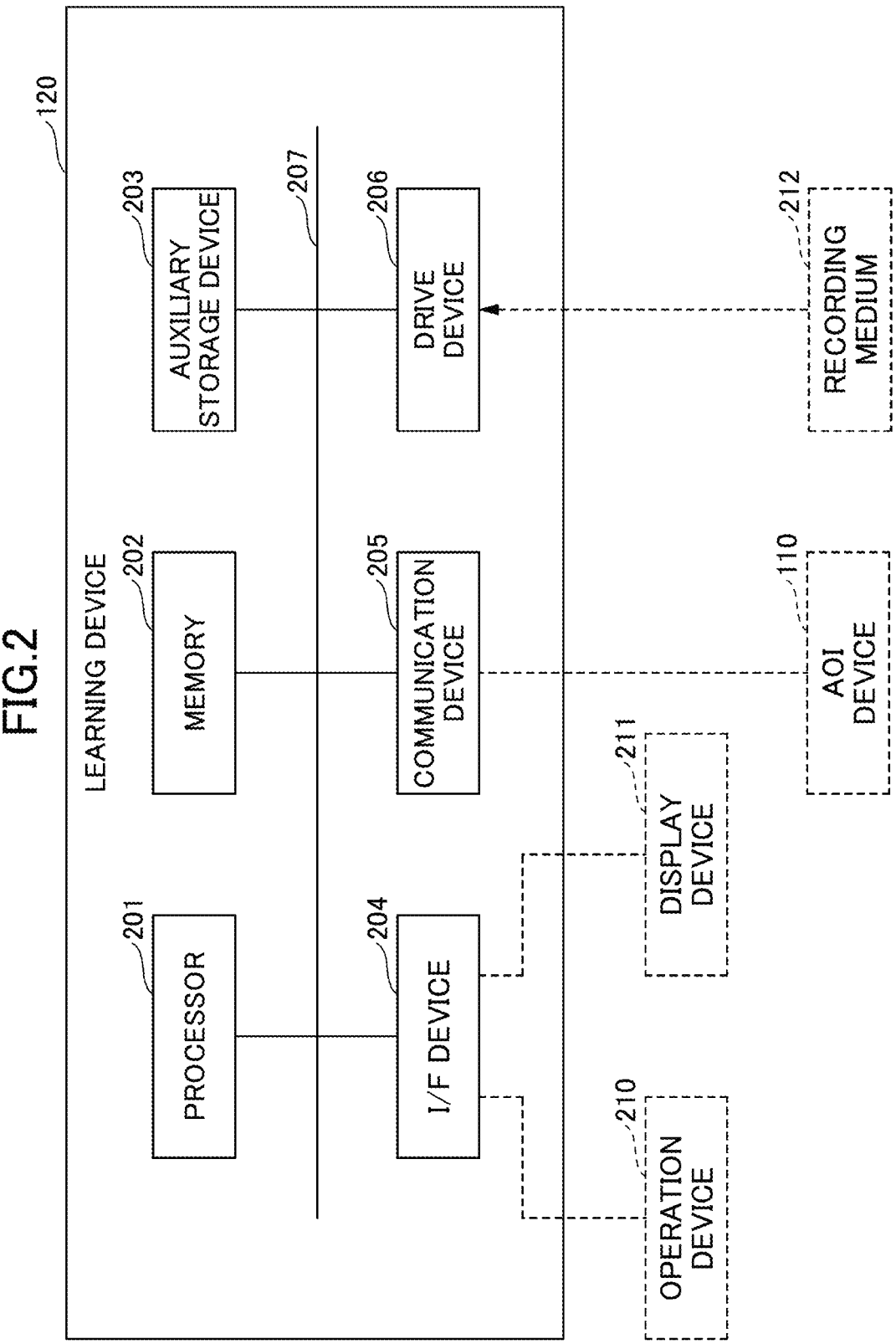
FIG. 2 is a diagram illustrating an example of a hardware configuration of a learning device.

Next, a hardware configuration of the learning device 120 will be described. FIG. 2 is a diagram illustrating an example of a hardware configuration of the learning device 120. As illustrated in FIG. 2, the learning device 120 includes a processor 201, a memory 202, an auxiliary storage device 203, an interface (I/F) device 204, a communication device 205, and a drive device 206. Note that the respective hardware units of the learning device 120 are interconnected via a bus 207.

The processor 201 includes various arithmetic/logic devices such as a central processing unit (CPU) and a graphics processing unit (GPU). The processor 201 reads various programs (e.g., a learning program, etc.) to be loaded onto the memory 202, and executes the programs.

The memory 202 includes main memory devices such as a read-only memory (ROM), a random access memory (RAM), and the like. The processor 201 and the memory 202 constitute what-is-called a computer, and by causing the processor 201 to execute the various programs loaded on the memory 202, the computer implements, for example, the functions described above (as implemented in the training dataset generating unit 121 and the learning unit 122).

The auxiliary storage device 203 stores the various programs and various items of data used when the various programs are executed by the processor 201. For example, the training dataset storage unit 123 is implemented in the auxiliary storage device 203.

The I/F device 204 is a connection device that connects an operation device 210 as an example of an external device and the display device 211 with the learning device 120. The I/F device 204 receives an operation performed on the learning device 120 via the operation device 210 (e.g., an operation performed by the inspector 111 to enter a result of visual inspection; an operation performed by an administrator (not illustrated) of the learning device 120 to enter a command for the learning process; or the like). Also, the I/F device 204 outputs results of the learning process and the like executed by the learning device 120, and displays the results for the administrator of the learning device 120 via the display device 211.

The communication device 205 is a communication device for communicating with another device (in the present embodiment, the AOI device 110).

The drive device 206 is a device for setting a recording medium 212. The recording medium 212 here includes a medium to record information optically, electrically, or magnetically, such as a CD-ROM, a flexible disk, a magneto-optical disk, or the like. Further, the recording medium 212 may include a semiconductor memory or the like to record information electrically, such as a ROM, a flash memory, or the like.

Note that the various programs installed in the auxiliary storage device 203 are installed by, for example, setting a distributed recording medium 212 in the drive device 206, and reading the various programs recorded on the recording medium 212 by the drive device 206. Alternatively, the various programs installed in the auxiliary storage device 203 may be installed by downloading from a network via the communication device 205.

Details of Units of Learning Device

Next, the respective units of the learning device 120 (here, the training dataset generating unit 121 and the learning unit 122) will be described in detail.

Figure 3:
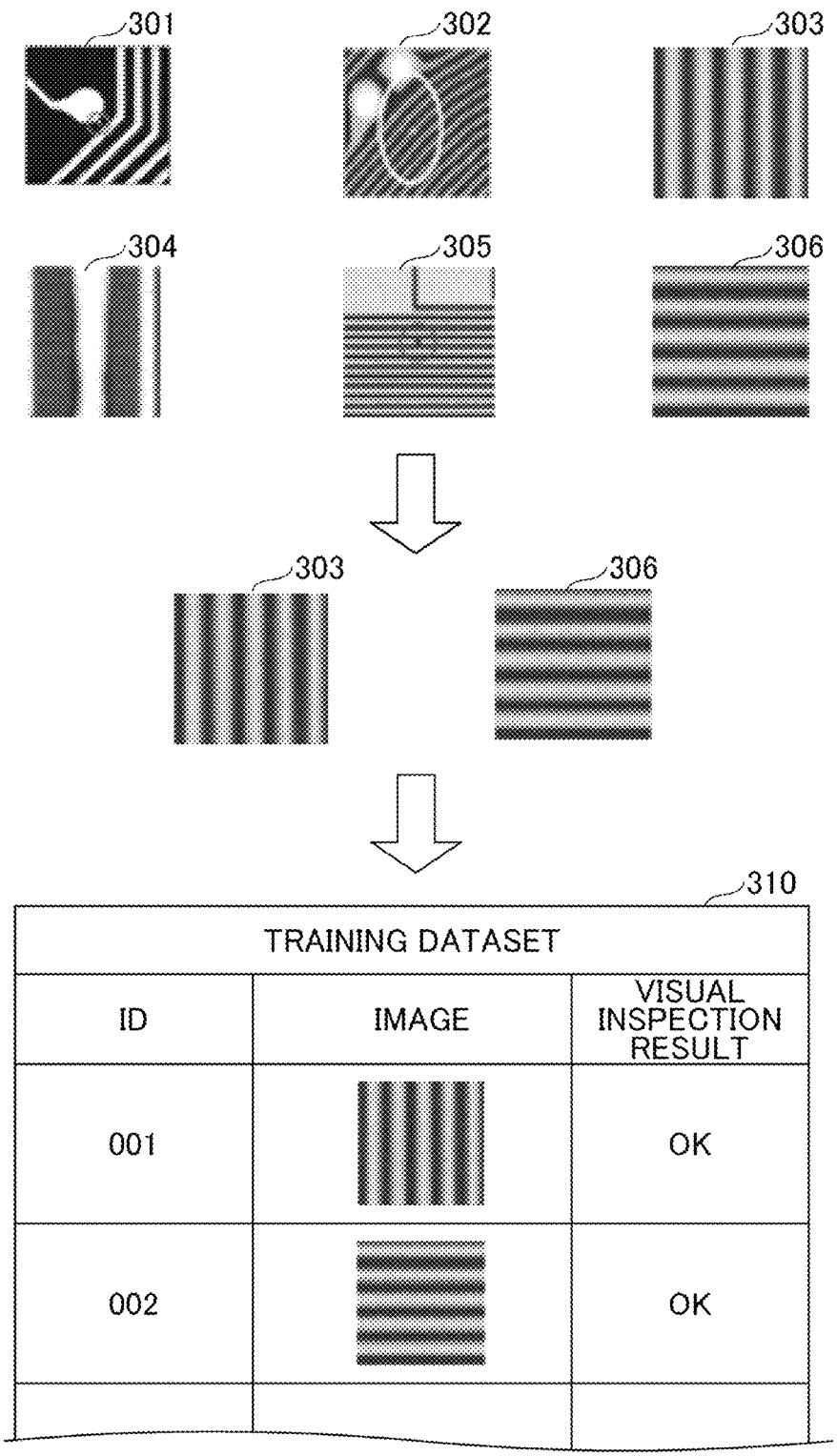
FIG. 3 is a diagram illustrating a specific example of processing executed by a training dataset generating unit of the learning device.

(1) Specific Example of Processing Executed by the Training Dataset Generating Unit FIG. 3 is a diagram illustrating a specific example of processing executed by the training dataset generating unit 121 of the learning device 120. As illustrated in FIG. 3, for example, when images 301 to 306 of respective regions that include candidate defects are transmitted from the AOI device 110, the training dataset generating unit 121 extracts images of "visual inspection result: OK".

The example in FIG. 3 illustrates that from among the images 301 to 306 of the respective regions, the images 301, 302, 304, and 305 are images of "visual inspection result: NG". Therefore, the training dataset generating unit 121 extracts the images 303 and 306 of corresponding regions (images of "visual inspection result: OK"), to generate a training dataset 310.

As illustrated in FIG. 3, the training dataset 310 includes, as fields of information, "ID", "image", and "visual inspection result".

The field of "ID" stores an identifier to identify an image of each region. The field of "image" stores the image of the region. The field of "visual inspection result" stores a result of visual inspection with respect to the image of the region. Note that only images of "visual inspection result: OK" are stored in the training dataset 310; therefore, only "OK" is stored in the field of "visual inspection result".

In this way, the training dataset generating unit 121 generates the training dataset 310 by using
  images of the respective regions that include candidate defects detected by the AOI device 110; and
  images that are determined by the inspector 111 as including no defect (images of "visual inspection result: OK").

(2) Specific Example of Processing Executed by the Learning Unit

Figure 4:
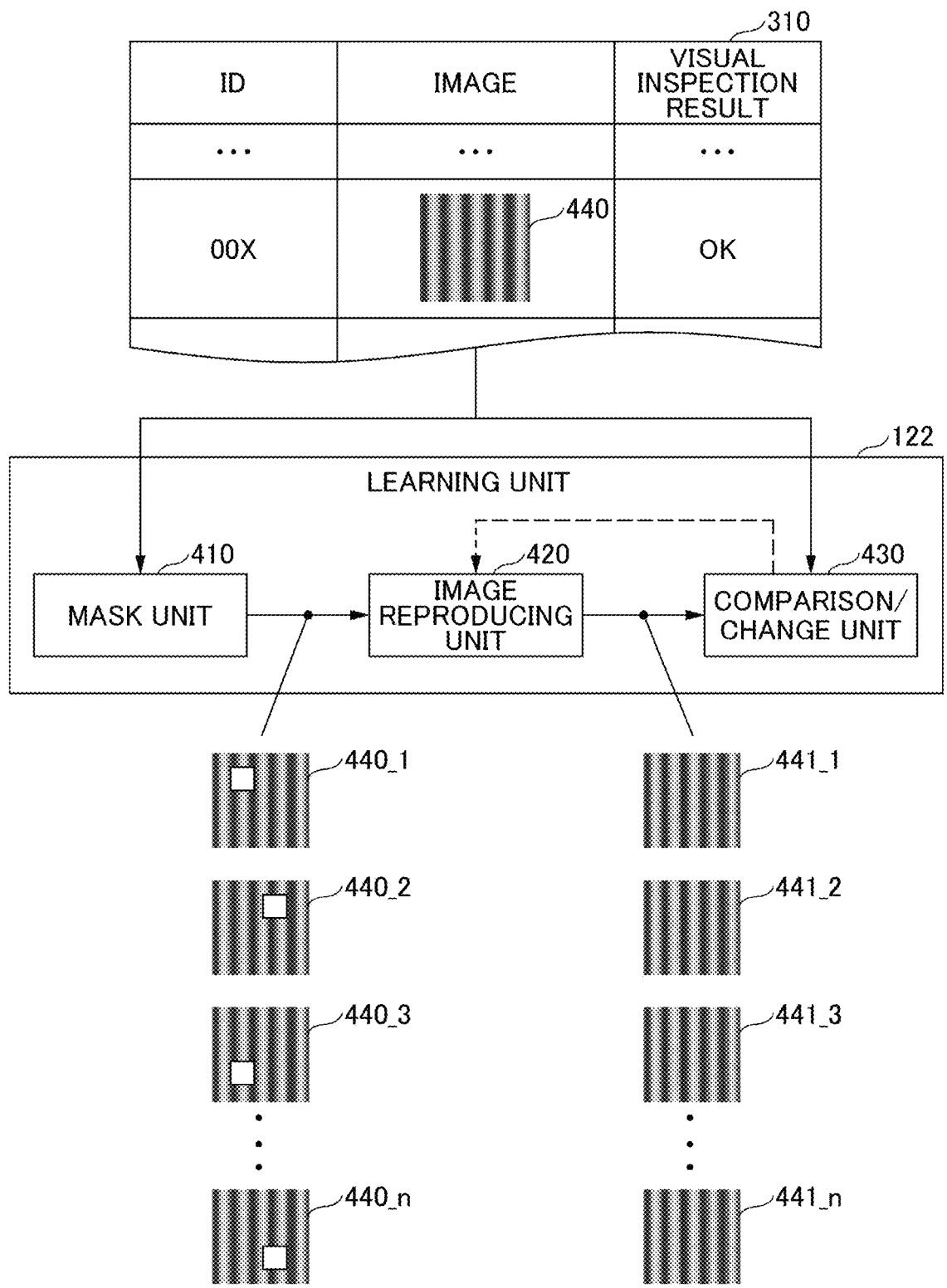
FIG. 4 is a first diagram illustrating a specific example of processing executed by a learning unit of the learning device.

FIG. 4 is a first diagram illustrating a specific example of processing executed by the learning unit 122 of the learning device 120. As illustrated in FIG. 4, the learning unit 122 includes a mask unit 410, an image reproducing unit 420, and a comparison/change unit 430.

The mask unit 410 reads the image of each region (an example of a first image, e.g., an image 440) stored in the field of "image" in the training dataset 310 stored in the training dataset storage unit 123. Also, the mask unit 410 masks part of the read image 440, to generate masked images (examples of a first masked image, e.g., masked images 440_1 to 440_n). Also, the mask unit 410 inputs the generated masked images 440_1 to 440_n into the image reproducing unit 420. Note that when the mask unit 410 masks the read image 440, the positions to be masked are selected randomly; for example, the mask unit 410 executes masking at around 9 to 16 positions.

Based on the masked images 440_1 to 440_n, the image reproducing unit 420 reproduces images before being masked 441_1 to 441_n, and outputs these images to the comparison/change unit 430.

The comparison/change unit 430 compares each of the images 441_1 to 441_n reproduced by the image reproducing unit 420, with the image before being masked 440 read by the mask unit 410, and updates model parameters of the image reproducing unit 420 so as to make both images consistent with each other.

In this way, for the image reproducing unit 420, a learning process is executed so as to reproduce the image before being masked 440 from the masked images 440_1 to 440_n generated by the mask unit 410. Thus, by adopting a configuration that uses the image reproducing unit 420, according to the learning device 120, an unsupervised learning process can foe executed. Also, an learning process can be executed using only images of the respective regions that do not include defects (images of "visual inspection result:

OK"). Therefore, compared to the case of collecting images of the respective regions that include various types of defects (images of "visual inspection result: NG") and executing a learning process, the cost of learning can be reduced.

Note that the trained image reproducing unit for which the learning process has been executed to reproduce an image before being masked is used in an inspection phase that will be described later.

System Configuration of Inspection System in Inspection Phase

Figure 5:
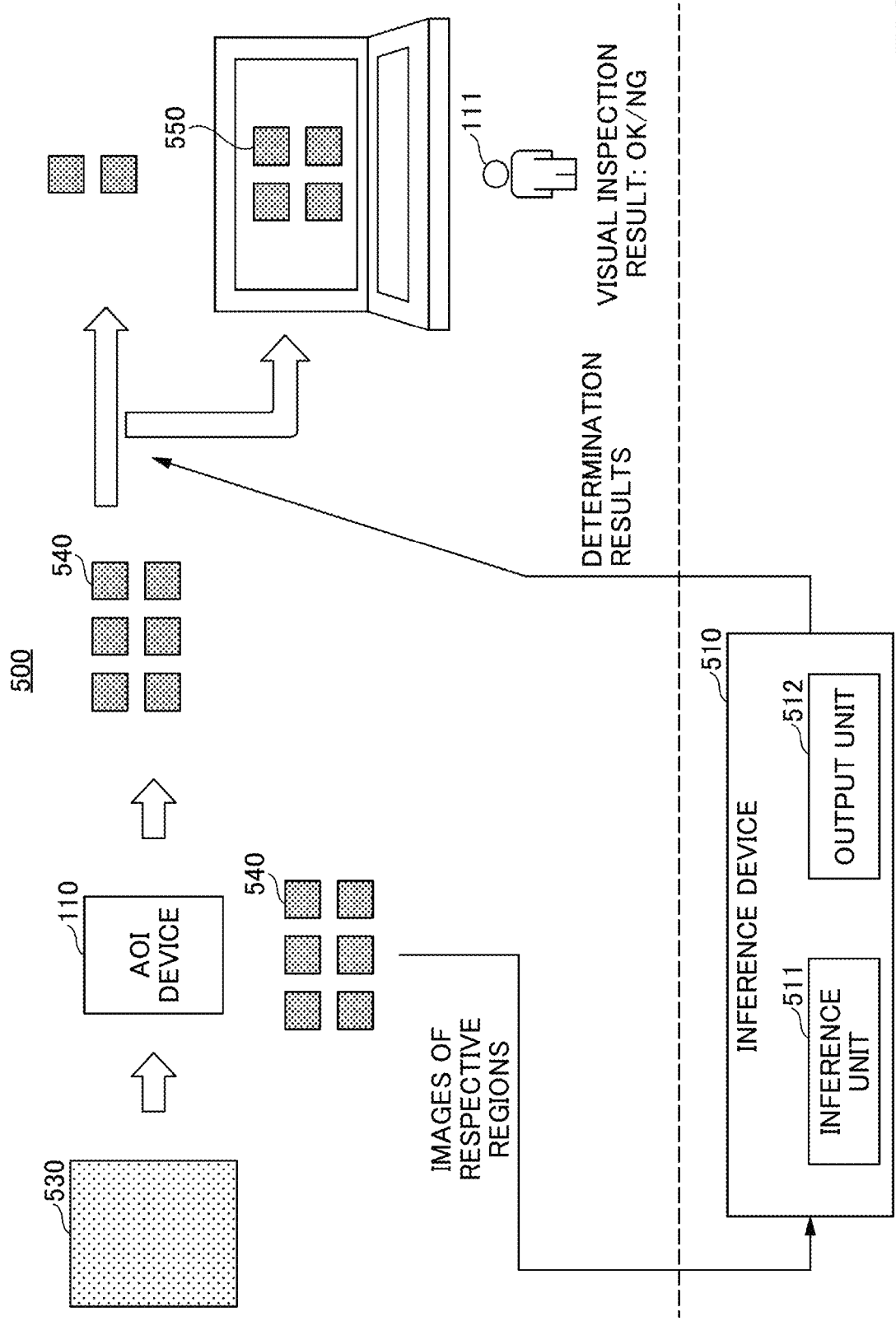
FIG. 5 is a diagram illustrating an example of a system configuration of an inspection system in an inspection phase.

Next, a system configuration of an inspection system in an inspection phase according to the first embodiment will be described. FIG. 5 is a diagram illustrating an example of a system configuration of an inspection system in an inspection phase.

As illustrated in FIG. 5, an inspection system 500 in the inspection phase includes an AOI device 110 and an inference device 510.

Among the elements, the AOI device 110 is the same as the AOI device 110 of the inspection system 100 in the learning phase; therefore, the description is omitted here.

An inspection program is installed in the inference device 510, and by executing the program, the inference device 510 functions as an inference unit 511 and an output unit 512.

The inference unit 511 includes a trained image reproducing unit that has been generated in the learning phase. The inference unit 511 obtains images 540 of the respective regions of a printed circuit board 530 as an object to be inspected from the AOI device 110, transmitted when automated appearance inspection is executed with respect to the printed circuit board 530. Also, the inference unit 511 masks part of the obtained image 540 of each region, to generate masked images, and inputs these images into the trained image reproducing unit. Also, the inference unit 511 compares each image reproduced by the trained image reproducing unit, with an image before being masked 540, to determine whether the image before being masked 540 of each region includes a defect. Further, the inference unit 511 informs the output unit 512 of the determination results.

The output unit 512 outputs the determination results informed from the inference unit 511 to the inspection line. On the inspection line, the inspector 111 visually inspects the image of each region that includes a candidate defect. However, in the inspection phase, on the inspection line, with reference to the determination results output by the output unit 512, images determined as including no defect by the inference device 510 are excluded, from among the images 540 of the respective regions that include candidate defects. Then, on the inspection line, from among the images 540 of the respective regions that include candidate defects, images 550 determined as including no defect by the inference device 510 are assigned to visual inspection. In other words, the output unit 512 outputs each image 550 determined as including a defect, so as to have the image 550 undergo the visual inspection.

In this way, the automated appearance inspection is executed by the AOI device 110 for the printed circuit board 530, and in the case where an image of a region that includes a candidate defect is detected, on the inspection line, the image determined as including a defect by the inference device 510 is assigned to visual inspection. As a result, according to the inspection system 500, the number of images assigned to the visual inspection can be reduced, and thereby, the workload of the visual inspection by the inspector 111 can be reduced.

Hardware Configuration of Inference Device

Figure 6:
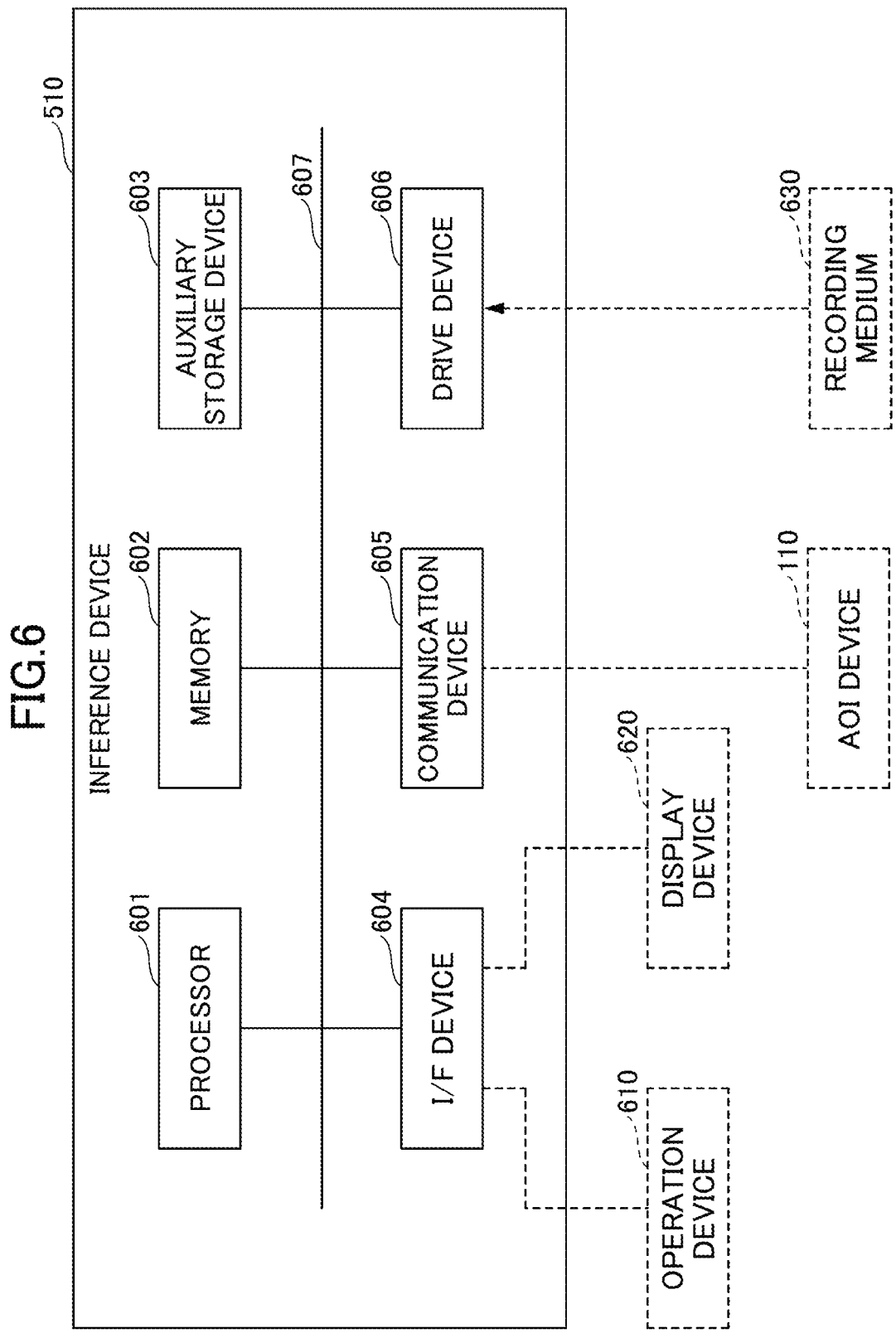
FIG. 6 is a diagram illustrating an example of a hardware configuration of an inference device.

Next, a hardware configuration of the inference device 510 will be described. FIG. 6 is a diagram illustrating an example of a hardware configuration of the inference device 510. Note that as illustrated in FIG. 6, the hardware configuration of the inference device 510 is substantially the same as the hardware configuration of the learning device 120; therefore, here, differences from the hardware configuration of the learning device 120 will be mainly described.

The processor 601 reads various programs (e.g., an inspection program, etc.) to be loaded onto the memory 602, and executes the programs. By causing the processor 601 to execute various programs loaded on the memory 602, the computer constituted with the processor 601 and the memory 602 implements, for example, the functions described above (as implemented in the inference unit 511 and the output unit 512).

Details of Units of Inference Device

Figure 7:
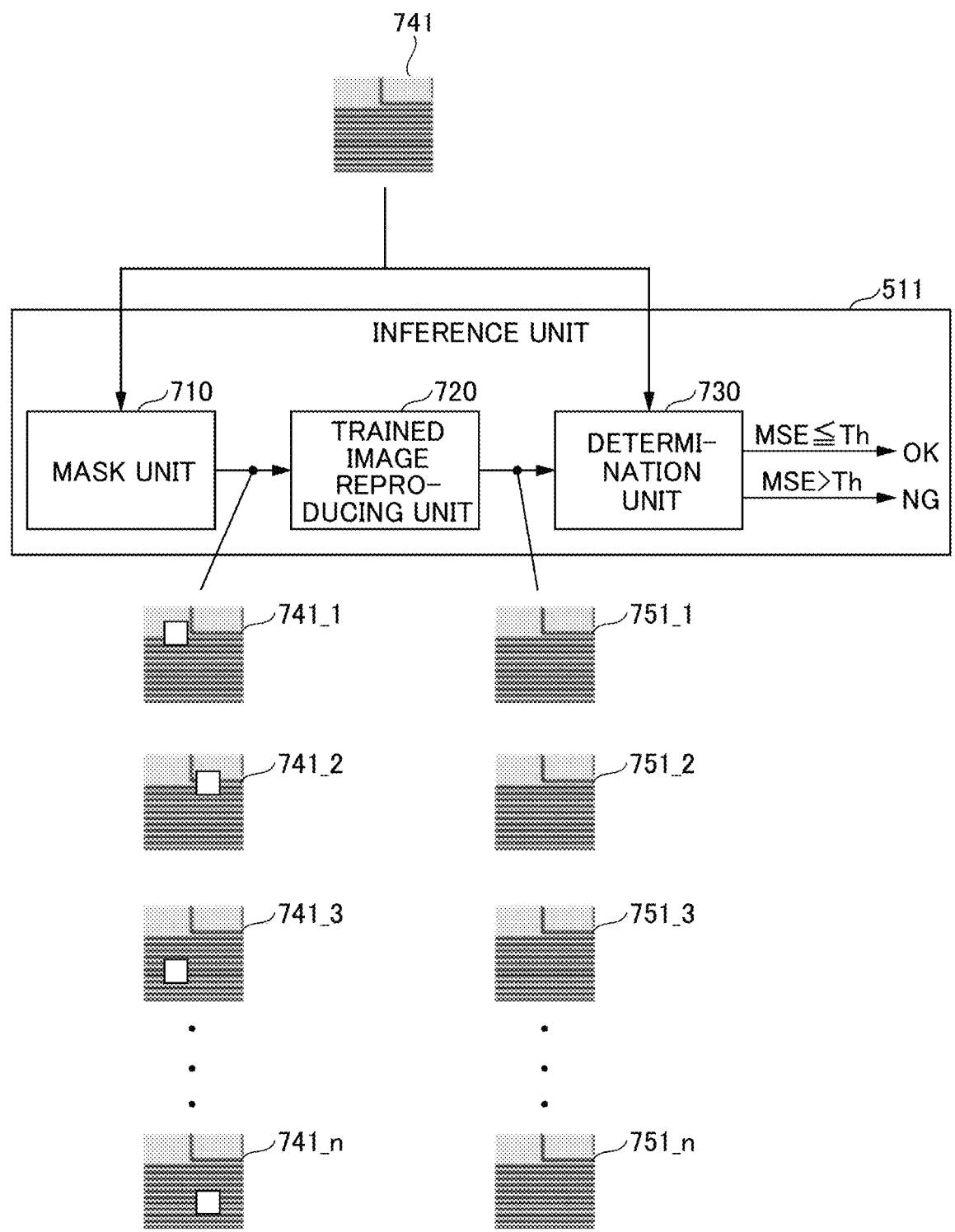
FIG. 7 is a first diagram illustrating a specific example of processing executed by an inference unit of the inference device.

Next, the respective units of the inference device 510 (here, the inference unit 511) will be described in detail. FIG. 7 is a first diagram illustrating a specific example of processing executed by the inference unit 511 of the inference device 510. As illustrated in FIG. 7, the inference unit 511 includes a mask unit 710, a trained image reproducing unit 720, and a determination unit 730.

The mask unit 710 obtains the image of each region (an example of a second image, e.g., an image 741) that includes a candidate defect transmitted from the AOI device 110, and masks part of the obtained image, to generate masked images (examples of second masked images, e.g., the masked images 741_1 to 741_n). Also, the mask unit 710 inputs the generated masked images 741_1 to 741_n into the trained image reproducing unit 720.

The trained image reproducing unit 720 is a trained model that has been generated by executing a learning process for the image reproducing unit 420 during the learning phase. Based on the masked images 440_1 to 440_n, the trained image reproducing unit 720 reproduces images before being masked (examples of a reproduced image of a second image, e.g., masked images 751_1 to 751_n).

The determination unit 730 compares each of the images 751_1 to 751_n reproduced by the trained image reproducing unit 720 with the image before being masked 741 obtained by the mask unit 710, to determine whether a defect is included.

Specifically, first, the determination unit 730 calculates the mean squared error (MSE) of pixel values of the reproduced image 751_1 and the image before being masked 741. Next, the determination unit 730 calculates the mean squared error (MSE) of pixel values of the reproduced image 751_2 and the image before being masked 741. Thereafter, similarly, the determination unit 730 calculates the mean squared error (MSE) of pixel values of the reproduced image 751_3 and the image before being masked 741, and so on, up to the mean squared error (MSE) of pixel values of the reproduced image 751_n and the image before being masked 741.

Next, the determination unit 730 determines whether each of the calculated MSEs is less than or equal to a predetermined threshold value (Th). In the case where it is determined that every calculated MSE is less than or equal to the predetermined threshold value, the image 741 is determined as not having a defect ("visual inspection result: OK"). On the other hand, in the case where it is determined that any one of the calculated MSEs exceeds the predetermined threshold value, the image 741 is determined as including a defect ("visual inspection result: NG").

In this way, the inference unit 511 compares a reproduced image with the image before being masked, to determine whether a defect is included. Thus, for example, compared to the case where an image before being masked is compared with a reference image to determine whether a defect is included, it becomes possible to output a determination result corresponding to manufacturing variations within a range of good products.

In other words, according to the inspection system 500, for images of the respective regions including candidate defects that are detected so as to implement prevention of missing defects, images that are expected to be "visual inspection result: OK" (images of "visual inspection result: OK") can be excluded appropriately from assignment to visual inspection. As a result, according to the inspection system 500, the number of images assigned to the visual inspection can be reduced, and thereby, the workload of the inspector can be reduced.

Flow of Learning Process

Figure 8:
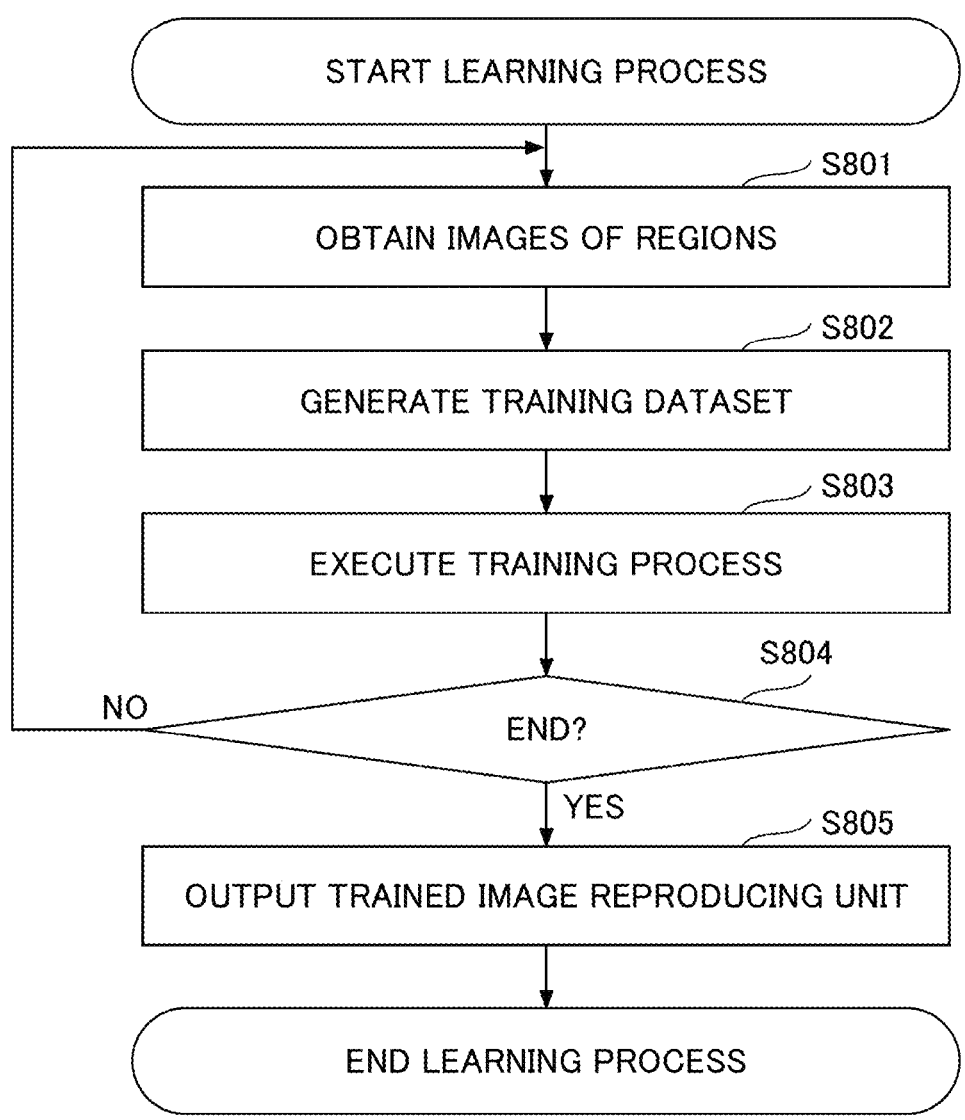
FIG. 8 is a first flow chart illustrating a flow of a learning process in the inspection system.

Next, a flow of the learning process in the inspection system 100 will be described. FIG. 8 is a first flow chart illustrating a flow of the learning process in the inspection system 100.

At Step S801, the training dataset generating unit 121 of the learning device 120 obtains images of the respective regions that include candidate defects from the AOI device 110.

At Step S802, the training dataset generating unit 121 of the learning device 120 extracts images of "visual inspection result: OK" from among the obtained images of the respective regions, to generate a training dataset.

At Step S803, the learning unit 122 of the learning device 120 generates a masked image by masking part of the image of each region included in the training dataset, and from the generated masked images, executes a learning process for the image reproducing unit so as to reproduce the image before being masked.

At Step S804, the learning unit 122 of the learning device 120 determines whether to end the learning process. If it is determined at Step S804 to continue the learning process (if NO is determined at Step S804), the process returns to Step S801.

On the other hand, if it is determined at Step S804 to end the learning process (if YES is determined at Step S804), the process proceeds to Step S805.

At Step S805, the learning unit 122 of the learning device 120 outputs the trained image reproducing unit, and ends the learning process.

Flow of Inspection Process

Figure 9:
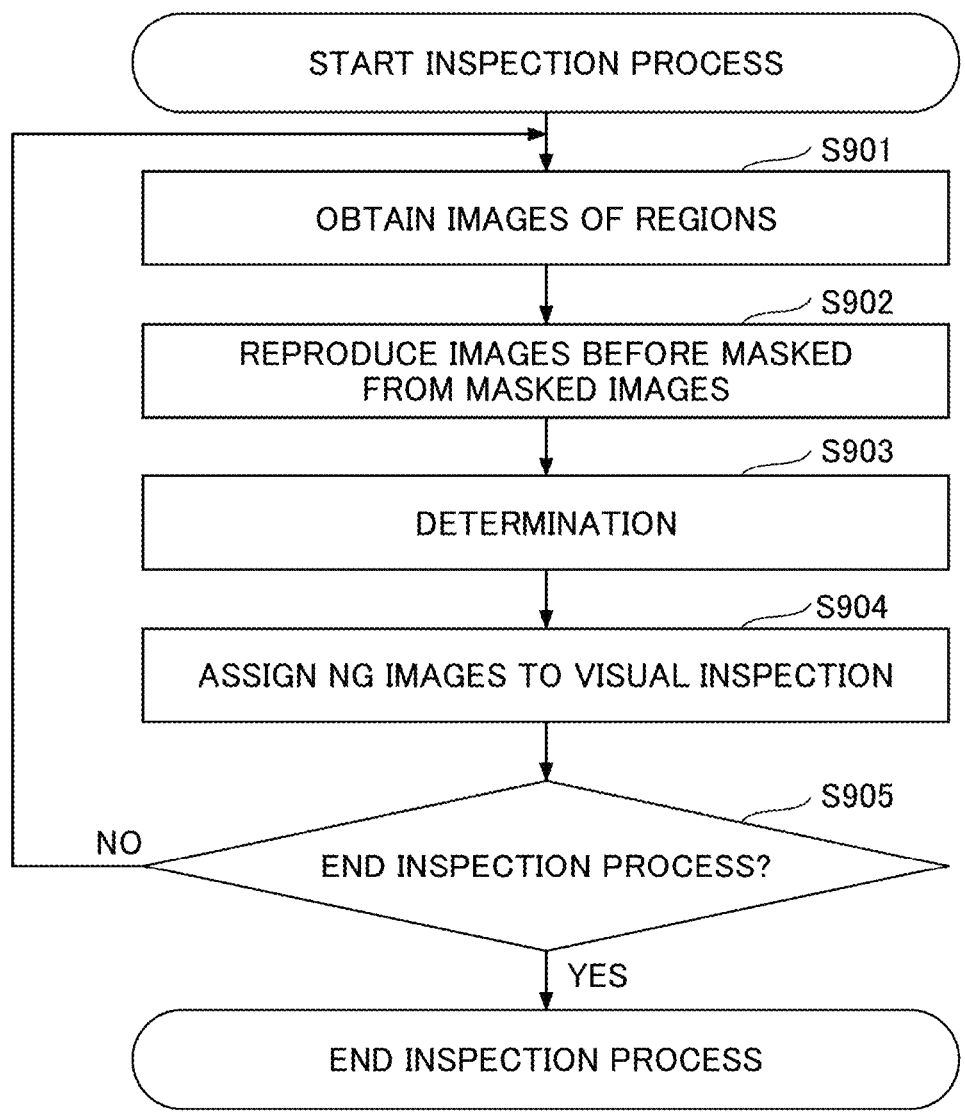
FIG. 9 is a first flow chart illustrating a flow of an inspection process in the inspection system.

Next, a flow of the inspection process in the inspection system 500 will foe described. FIG. 9 is a first flow chart illustrating a flow of the inspection process in the inspection system 500.

At Step S901, the inference unit 511 of the inference device 510 obtains images of the respective regions that include candidate defects from the AOI device 110.

At Step S902, the inference unit 511 of the inference device 510 masks part of the obtained image of each region, to generate a masked image, and inputs the generated masked images into the trained image reproducing unit, to reproduce the image before being masked.

At Step S903, the inference unit 511 of the inference device 510 compares the reproduced image with the image before being masked, and calculates the MSE, to determine whether the image before being masked includes a defect.

Specifically, the inference unit 511 of the inference device 510 partitions the obtained image into, for example, nine regions of three partitions in the vertical direction times three partitions in the horizontal direction. Next, the inference unit 511 of the inference device 510 executes the process of calculating the MSE for the masked image generated by masking one of the partitioned regions, for nine times while changing the partitioned region to be masked in order. Then, if the MSE for any one of the masked images exceeds the threshold value, the inference unit 511 of the inference device 510 determines that the obtained image includes a defect ("visual inspection result: NG").

At Step S904, the output unit 512 of the inference device 510 informs the determination result. In this way, the images of the respective regions that include candidate defects detected by the AOI device 110 upon executing automated appearance inspection, are classified into images that are determined as including no defect (images of "visual inspection result: OK") and images that are determined as including a defect (images of "visual inspection result: NG"). As a result, it becomes possible to assign only images determined as including a defect (images of "visual inspection result: NG") to visual inspection.

At Step S905, the inference unit 511 of the inference device 510 determines whether to end the inspection process. If it is determined at Step S905 to continue the inspection process (if NO is determined at Step S905), the process returns to Step S901.

On the other hand, if it is determined at Step S905 to end the inspection process (if YES is determined at Step S905), the inspection process ends.

Summary

As clarified from the above description, the inspection system according to the first embodiment,
generates a masked image by masking part of an image that is determined as including no defect from among images that capture a printed circuit board, and then, executes a learning process for the image reproducing unit so as to reproduce the image before being masked from the generated masked image; and
generates a masked image by masking part of an image that captures a new printed circuit board, and then, by inputting the generated masked image into the trained image reproducing unit to reproduce an image before being masked, and comparing the reproduced image with the image before being masked, determines whether the image before being masked includes a defect.

In this way, by comparing a reproduced image with the image before being masked to determine whether a defect is included, it becomes possible to output a determination result corresponding to manufacturing variations within a range of good products.

In other words, according to the first embodiment, for images of the respective regions including candidate defects that are detected so as to implement prevention of missing defects, images that are expected to be "visual inspection result: OK" (images of "visual inspection result: OK") can be excluded appropriately from assignment to visual inspection. As a result, according to the first embodiment, the number of images assigned to the visual inspection can be reduced, and thereby, the workload of the inspector can be reduced.

Second Embodiment

In the description of the first embodiment above, it is assumed that a masked image generated by masking part of the image of each region is input into the image reproducing unit. In contrast, in the second embodiment, a case will be described in which CAD (Computer-aided design) data is superimposed on a masked image generated by masking part of the image of each region, and then, input into the image reproducing unit. In the following, the second embodiment will be described focusing on differences from the first embodiment described above.

Specific Example of Processing Executed by the Learning Unit

Figure 10:
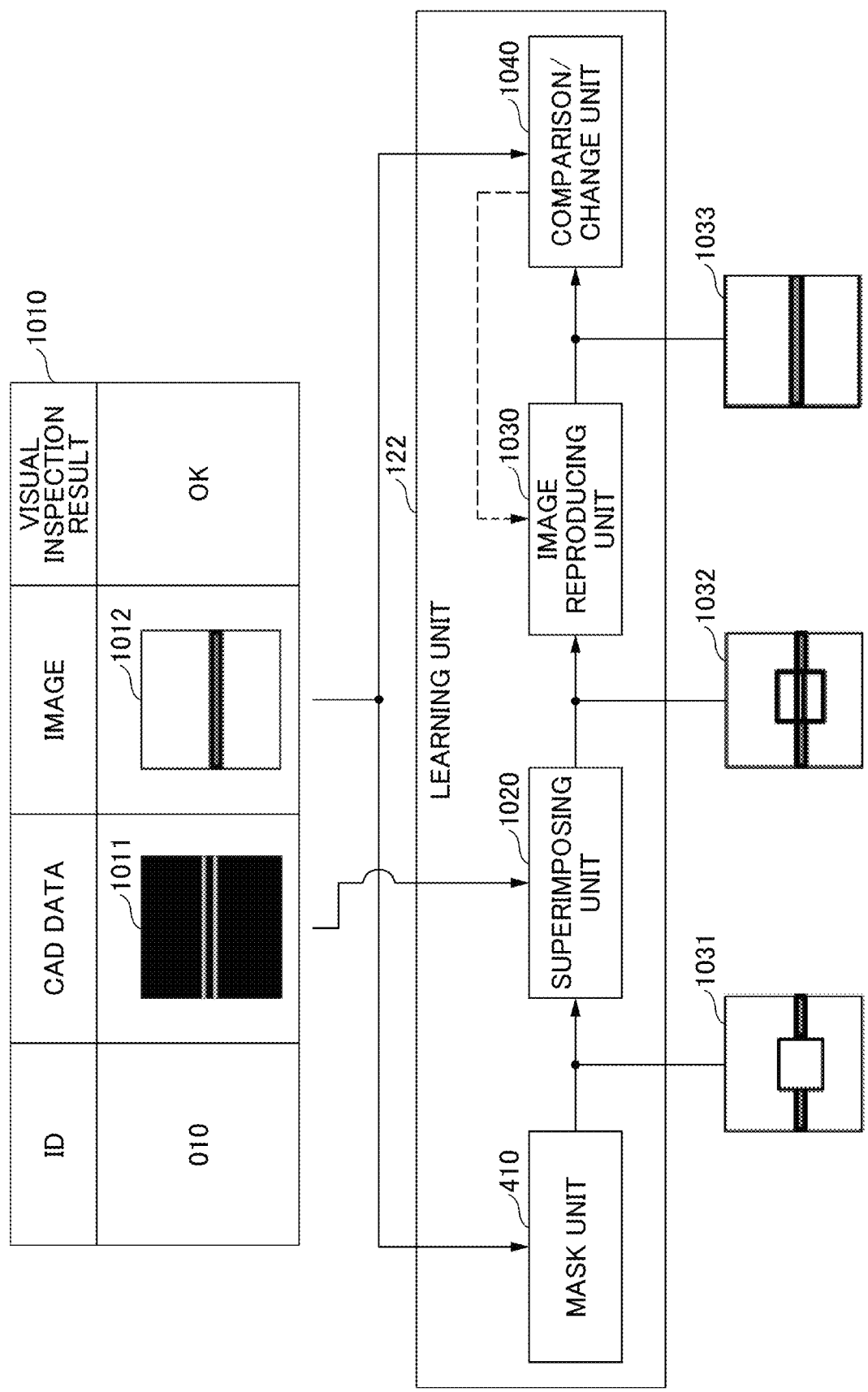
FIG. 10 is a second diagram illustrating a specific example of processing executed by the learning unit of the learning device.

First, from among the respective units of a learning device 120 according to the second embodiment, a learning unit 122 will be described in terms of a specific example of processing. FIG. 10 is a second diagram illustrating a specific example of processing executed by the learning unit 122 of the learning device 120.

As illustrated in FIG. 10, in the second embodiment, it is assumed that when the learning unit 122 executes processing, a training dataset 1010 is stored in a training dataset storage unit 123.

The training dataset 1010 includes "CAD data" as a field of information in addition to the fields of information in the training dataset 310. The field of "CAD data" stores CAD data of each region corresponding to an image stored in the field of "image". The example in FIG. 10 illustrates a state in which CAD data 1011 of a region corresponding to an image 1012 is stored.

Also, as illustrated in FIG. 10, the learning unit 122 includes a mask unit 410, a superimposing unit 1020, an image reproducing unit 1030, and a comparison/change unit 1040.

The mask unit 410 is substantially the same as the mask unit 410 described in FIG. 4, and the example in FIG. 10 illustrates a state in which a masked image 1031 is generated by reading the image 1012 stored in the field of "image" of the training dataset 1010, and masking part of it.

The superimposing unit 1020 superimposes a corresponding region of the CAD data on the masked region of the masked image that is generated by the mask unit 410, to generate a superimposed image. The example in FIG. 10 illustrates a state in which a superimposed image 1032 is generated by superimposing the corresponding region of the CAD data 1011 on the masked region of the masked image 1031.

Based on the superimposed image generated by the superimposing unit 1020, the image reproducing unit 1030 reproduces an image before being masked, and outputs the image to the comparison/change unit 1040. The example in FIG. 10 illustrates a state in which an image before being masked 1033 is reproduced based on the superimposed image 1032 generated by the superimposing unit 1020, and output to the comparison/change unit 1040.

The comparison/change unit 1040 compares the image 1033 reproduced by the image reproducing unit 1030, with the image before being masked 1012 read by the mask unit 410, and updates model parameters of the image reproducing unit 1030 so as to make both images consistent with each other.

In this way, for the image reproducing unit 1030, a learning process is executed so as to reproduce the image before being masked 1012 from the superimposed image 1032 generated by the superimposing unit 1020. Note that the trained image reproducing unit for which the learning process has been executed to reproduce an image before being masked is used in an inspection phase that will be described later.

Specific Example of Processing of Units of the Inference Device

Figure 11:
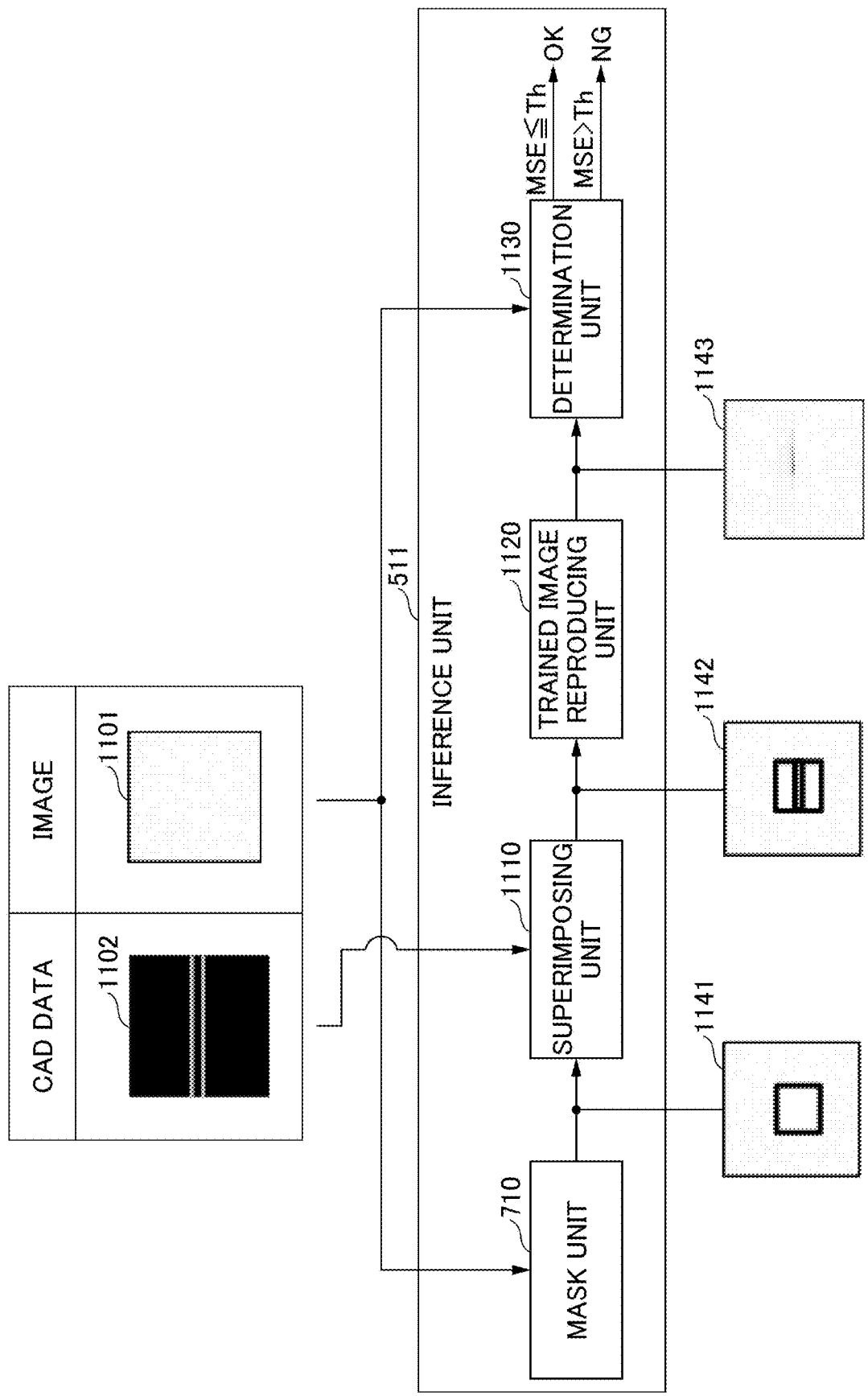
FIG. 11 is a second diagram illustrating a specific example of processing executed by the inference unit of the inference device.

Next, a specific example of processing executed by the inference unit 511 of the inference device 510 will be described. FIG. 11 is a second diagram illustrating a specific example of processing executed by the inference unit 511 of the inference device 510. As illustrated in FIG. 11, the inference unit 511 includes a mask unit 710, a superimposing unit 1110, a trained image reproducing unit 1120, and a determination unit 1130.

The mask unit 710 is substantially the same as the mask unit 710 described in FIG. 7, and the example in FIG. 11 illustrates a state in which a masked image 1141 is generated by masking part of an image 1101 transmitted from the AOI device 110. Note that the image 1101 is an image that includes a defect such as a short circuit.

The superimposing unit 1110 superimposes a corresponding region of the CAD data on the masked region of the masked image that is generated by the mask unit 710, to generate a superimposed image. The example in FIG. 11 illustrates a state in which a superimposed image 1142 is generated by superimposing the corresponding region of the CAD data 1102 on the masked region of the masked image 1141.

The trained image reproducing unit 1120 is a trained model that has been generated by executing a learning process for the image reproducing unit 1030 during the learning phase. Based on the superimposed image informed by the superimposing unit 1110, the trained image reproducing unit 1120 reproduces an image before being masked. The example in FIG. 11 illustrates a state in which an image before being masked 1143 is reproduced, based on the superimposed image 1142 informed by the superimposing unit 1110.

The determination unit 1130 compares the image 1143 reproduced by the trained image reproducing unit 1120 with the image before being masked 1101 obtained by the mask unit 710, to determine whether a defect is included. The example in FIG. 11 illustrates a state in which as a result of comparing the image 1143 reproduced by the trained image reproducing unit 1120 with the image before being masked 1101 obtained by the mask unit 710, the MSE exceeds a predetermined threshold value, and thereby, the image is determined as including a defect ("visual inspection result: NG").

In this way, in the case of the image 1101 that includes a defect such as a short circuit, only with the masked image described in the first embodiment, it is difficult to operate the device to reproduce an image of "visual inspection result: OK". This is because in the case of a defect such as a short circuit, the surroundings of the masked region do not include information necessary to complement the masked region.

In contrast, as described above, by superimposing a corresponding region of the CAD data on the masked region, it becomes possible to operate the device to reproduce an image of "visual inspection result: OK". As a result, the error between the reproduced image and the image before being masked becomes greater, and thereby, it becomes possible to determine that a defect such as a short circuit is included more precisely.

Flow of Learning Process

Next, a flow of the learning process in the inspection system 100 according to the second embodiment will be described. FIG. 12 is a second flow chart illustrating a flow of the learning process in the inspection system 100. Differences from the first flow chart illustrated in FIG. 8 are Steps S1201 to S1203.

At Step S1201, the training dataset generating unit 121 of the learning device 120 obtains CAD data corresponding to images of the respective regions obtained at Step S801.

At Step S1202, the training dataset generating unit 121 of the learning device 120 extracts images of "visual inspection result: OK" from among the obtained images of the respective regions. Also, the training dataset generating unit 121 of the learning device 120 associates each of the extracted images of the respective regions with a corresponding region of the CAD data, to generate a training dataset.

At Step S1203, the learning unit 122 of the learning device 120 generates a masked image by masking part of the image of each region, and then, generates a superimposed image included in the training dataset by superimposing the corresponding region of the CAD data.

The following Steps S803 to S805 have been described with reference to FIG. 8; therefore, the description is omitted here.

Flow of Inspection Process

Next, a flow of the inspection process in the inspection system 500 according to the second embodiment will be described. FIG. 13 is a second flow chart illustrating a flow of the inspection process in the inspection system 500. Differences from the first flow chart illustrated in FIG. 9 are Steps S1301 to S1302.

At Step S1301, the inference unit 511 of the inference device 510 obtains regions of CAD data corresponding to images of the respective regions obtained at Step S901.

At Step S1302, the inference unit 511 of the inference device 510 generates a masked image by masking part of the obtained image of each region, and then, superimposes the corresponding region of the CAD data, to generate a superimposed image.

The following Steps S902 to S905 have been described with reference to FIG. 9; therefore, the description is omitted here.

Summary

As clarified from the description, the inspection system for the second embodiment, generates a masked image by masking part of an image determined as including no defect from among images that capture a printed circuit board, and then, superimposes the corresponding region of CAD data, to generate a superimposed image, and then, executes a learning process for the image reproducing unit so as to reproduce an image before being masked from the generated superimposed image; and generates a masked image by masking part of an image that captures a new printed circuit board, and then, superimposes the corresponding region of the CAD data, to generate a superimposed image, and then, by inputting the generated superimposed image into the trained image reproducing unit to reproduce an image before being masked, and comparing the reproduced image with the image before being masked, determines whether the image before being masked includes a defect.

In this way, by adopting a configuration in which a learning process is executed so as to be capable of reproducing an image of "visual inspection result: OK" from a superimposed image, it becomes possible to determine a defect including a short circuit or the like more precisely. As a result, according to the second embodiment, while enjoying substantially the same effects as in the first embodiment described above, it becomes possible to avoid an erroneous determination.

Third Embodiment

In the description of the first embodiment above, in the learning phase, it is assumed that the mask unit 410 generates multiple masked images (e.g., the masked images 440_1 to 440_n) for one image (e.g., the image 440). However, the masked images that are generated from one image are not limited to multiple images, for example, the mask unit 410 may be configured to generate only one masked image from one image.

Also, in the first embodiment described above, although a specific number of iterations and the like in the learning process executed by the learning unit 122 are not mentioned, for example, in the case of generating one masked image from one image, 10,000 images are prepared as a training dataset 310,
from among these 10,000 images, 20 images are selected each of which is masked at a random position with a random size,
a process of updating the model parameters of the image reproducing unit 420 using these 20 masked images is executed for 500 times (=10,000/20), and
one set of these steps is iterated for 10,000 sets until the error converges.

In this way, the inference unit 511 can output a highly precise determination result.

In the second embodiment described above, although it has been described assuming that CAD data is superimposed on a masked image, data to be superimposed on a masked image is not limited to CAD data. For example, in the inspection phase, the processing may be configured to have a corresponding region of an image of "visual inspection result: OK" superimposed on the masked image.

Also, in the first and second embodiments described above, although they have been described for the case in which an object to be inspected is a printed circuit board, the object to be inspected is not limited to a printed circuit board.

Also, in the first and second embodiments described above, they have been described assuming that an image assigned to visual inspection is determined based on the determination result. However, the method of using the determination result is not limited as such; for example, the method may be configured to display the determination result for the inspector 111, so as to support the visual inspection.

Also, in the first and second embodiments described above, although the learning device 120 and the inference device 510 are configured as separate devices, the learning device 120 and the inference device 510 may be configured as a unified device.

Note that the present inventive concept is not limited to the configurations described herein including the configurations exemplified in the above embodiments; those combined with other elements; and the like. In these regards, it is possible to alter a configuration within a range not deviating from the gist of the present inventive concept, and the range can be appropriately determined according to the application form.

The invention claimed is:

1. An inspection system comprising:
a memory; and
a processor,
wherein the memory is configured to hold an image reproducing model trained to reproduce, from a first masked image generated by masking part of a first image determined as including no defect from among images that capture an object to be inspected, the first image before being masked, and
wherein the processor is configured to determine, based on a reproduced image reproduced by inputting a second masked image generated by masking part of a second image that captures a new object to be inspected into the image reproducing model, and the second image, whether the second image includes a defect.

2. The inspection system as claimed in claim 1, wherein the processor determines that the second image includes no defect, in a case where a value calculated based on errors between pixel values of pixels of the reproduced image and the second image is less than or equal to a predetermined threshold value, and
determines that the second image includes a defect, in a case where the value calculated based on the errors between the pixel values of the pixels of the reproduced image and the second image exceeds the predetermined threshold value.

3. The inspection system as claimed in claim 2, wherein the processor is further configured to output the second image so as to have the second image undergo visual inspection in a case where the processor determines that the second image includes a defect.

4. The inspection system as claimed in claim 1, wherein the image reproducing model is trained so as to reproduce the first image before being masked from a superimposed image obtained by having CAD data superimposed on the generated first masked image, and
wherein the processor determines whether the second image includes a defect, based on a reproduced image reproduced by inputting a superimposed image obtained by having CAD data superimposed on the generated second masked image, and the second image.

5. The inspection system as claimed in claim 4, wherein the processor is further configured to execute a learning process for the image reproducing model so as to reproduce the first image before being masked, from the superimposed image obtained by superimposing the CAD data on the first masked image generated by masking the part of the first image determined as including no defect, from among the images that capture the object to be inspected.

6. The inspection system as claimed in claim 1, wherein the processor is further configured to execute a learning process for the image reproducing model so as to reproduce the first image before being masked, from the first masked image generated by masking the part of the first image determined as including no defect, from among the images that capture the object to be inspected.

7. A method of inspection executed by a computer including a memory and a processor, the method comprising:
    loading into the memory an image reproducing model trained to reproduce, from a first masked image generated by masking part of a first image determined as including no defect from among images that capture an object to be inspected, the first image before being masked; and
    determining, based on a reproduced image reproduced by inputting a second masked image generated by masking part of a second image that captures a new object to be inspected into the image reproducing model, and the second image, whether the second image includes a defect.

8. A non-transitory computer-readable recording medium having computer-readable instructions stored thereon, which when executed, cause a computer including a memory and a processor to execute a method of inspection, the method comprising:
    loading into the memory an image reproducing model trained to reproduce, from a first masked image generated by masking part of a first image determined as including no defect from among images that capture an object to be inspected, the first image before being masked; and
    determining, based on a reproduced image reproduced by inputting a second masked image generated by masking part of a second image that captures a new object to be inspected into the image reproducing model, and the second image, whether the second image includes a defect.

* * * * *